United States Patent Office 3,553,274
Patented Jan. 5, 1971

3,553,274
PROCESS FOR THE PREPARATION OF ALKYLATED BENZENES HAVING HALOGEN SUBSTITUENTS IN THE 3,5- OR 3,4,5-POSITIONS
Sheldon N. Lewis, Willow Grove, and Colin Swithenbank, Perkasie, Pa., assignors to Rohm & Haas Company, Philadelphia, Pa., a corporation of Delaware
No Drawing. Filed June 28, 1967, Ser. No. 649,488
Int. Cl. C07c 25/04, 25/08, 25/10
U.S. Cl. 260—650
8 Claims

ABSTRACT OF THE DISCLOSURE

Alkyl benzenes in which the alkyl group is of the secondary or tertiary type and which have halogen or methyl substituents in the 2,4- or 2,3,4-positions may be catalytically isomerized in good yield to the corresponding 3,5- and 3,4,5-substituted alkyl benzenes. Catalysts for the isomerization are $HAlBrCl_3$, $HAlBr_2Cl_2$, $HAlBr_3Cl$ and $HAlBr_4$. The resulting products are of particular interest as precursors for the corresponding benzoic acids.

BACKGROUND OF THE INVENTION

Benzoic acids of the structure

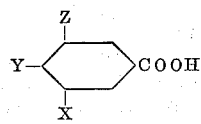

wherein X and Z are Br, Cl, F and methyl and

Y is hydrogen, Br, Cl, F and methyl are useful as herbicides and herbicide and pharmaceutical intermediates. In one particular use they are needed for the preparation of certain N-substituted benzamides, desired as selective herbicides.

Heretofore, benzoic acids having 3,5-substituents have been prepared by expensive and cumbersome methods. For example, a literature method for obtaining 3,5-dichlorobenzoic acid is to chlorinate ethyl p-aminobenzoate to ethyl 3,5-dichloro-4-aminobenzoate, then remove the amino group by diazotization and reduction, followed by hydrolysis of the resulting ester. The oxidation of 3,5-disubstituted alkylbenzenes is also known, but these starting alkylbenzenes are not readily available.

A method has now been found by which alkylbenzenes of the structure

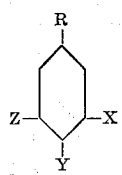

wherein X, Y and Z have the previously noted meanings and R is the group

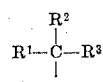

wherein $R^1$ is hydrogen or an alkyl group of one to six carbon atoms and $R^2$ and $R^3$ are alkyl groups of one to six carbon atoms, can be readily made in good yield. In all subsequent formulas the meanings of R, X, Y and Z will be as above-designated. The method consists in the rearrangement of the alkylated benzenes of the structure

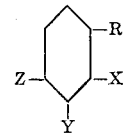

to the structures

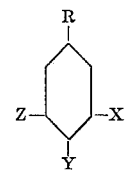

Isomerizations of several haloalkylbenzenes with aluminum chloride have been studied and reported in the literature. In the reported cases for monohaloethylbenzenes (G. A. Olah et al., J. Org. Chem. 30, 541–544 (1965), monohalocumenes (G. A. Olah et al., J. Org. Chem. 31, 1262–67 (1966) and monohalo-t-butylbenzenes (G. A. Olah et al., J. Org. Chem. 31, 1268–1271, (1966) equilibrium mixtures containing the ortho, meta and parahaloalkylbenzene isomers were obtained. When m-dichlorobenzene was alkylated using propylene and sulfuric acid, 2,4-dichlorocumene was obtained (see Chemical Abstracts 57, 9700i (1962). Toluene has been alkylated with t-butyl chloride under equilibrating conditions (Allinger et al., J. Am. Chem. Soc. 88, 3000 (1966)).

SUMMARY OF THE INVENTION

It has now been found that compounds of the structure

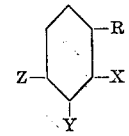

can be isomerized in good yield according to the following equation:

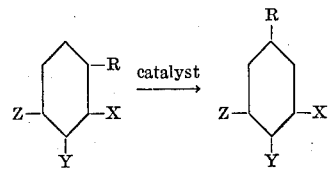

The catalysts which are effective for this isomerization are $HAlBrCl_3$, $HAlBr_2Cl_2$, $HAlBr_3Cl$ and $HAlBr_4$. The rate of catalysis increases somewhat with increasing bromine content, the rate with $HAlBr_4$ being about twice that obtained with $HAlBrCl_3$. For all practical purposes any catalysis with $HAlCl_4$ is much too slow and only minor amounts of isomerization occurs even after a reaction time of a week or more.

The catalysts can be prepared in situ or can be added to the alkylated benzene or the benzene derivative to be alkylated as an independently prepared entity.

The reactions can proceed in several ways, e.g.

(a) The alkylated benzenes corresponding to the structure

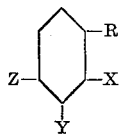

can be prepared separately and then isomerized with the above catalysts, and (b) Alkylation of the substituted benzene can be achieved with an alkyl bromide in the presence of anhydrous aluminum chloride, and the $HAlBrCl_3$ produced catalyzes the isomerization. The equation for this series of reactions is

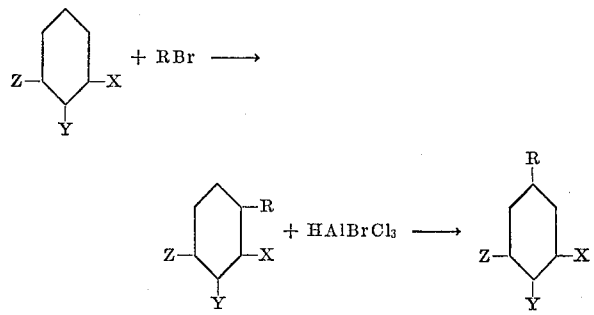

For the alkylation, equimolar amounts of the alkyl bromide and substituted benzene are preferred. An excess of alkyl bromide up to 1.5 molar equivalents may be used, but there is a greater tendency for di- or poly-alkylation and the yield of the desired mono-alkylated benzene is reduced.

The amount of catalyst required for the isomerization is from 5 to 25 mol percent based on the alkyl benzene to be isomerized. Below 5 mol percent the isomerization proceeds at too slow a pace to be practical and above 25 mol percent there is an increasing tendency to dialkylate the alkyl benzenes. For economic considerations and ease in working up the reaction mixtures, it is preferred to keep the catalyst concentration low. A preferred range for the catalyst is 5 to 15 mol percent.

The temperature for the isomerization reaction is in the range of −10° C. to 75° C. Optimum temperatures for producing

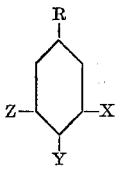

structures vary with the specific isomerization involved and with the catalyst concentration, among other things. At the lower range of catalyst concentration, i.e. 5 mol to 10 mol percent, the optimum temperature appears to be in the 20° to 30° C. range, whereas at higher catalyst concentrations optimum results are obtained over the wider temperature range of 5° to 30° C.

The reaction time for the isomerization of

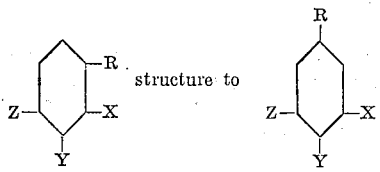

compounds is not critical and holding times from 1 hour to 100 hours are commonly used. Holding times in the range of 2 to 20 hours are preferred.

Solvents are not required for the isomerization reactions and it is preferred not to have solvents. However, solvents which are commonly used in Friedel-Crafts type reactions, such as carbon disulfide, may be used.

The

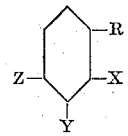

compounds may be prepared and isolated before isomerization by any method known to those skilled in the art. For example, alkyl benzenes may be halogenated to the 2,4-dihalo derivatives. In another method of preparation 1,3-disubstituted and 1,2,3-trisubstituted benzenes may be alkylated with halo-substituted n-alkanes having a halo atom in the 1,2,3 etc. position. This will produce R-substituents of the structure —$CHR^2R^3$ wherein $R^2$ and $R^3$ are alkyl groups the sum of whose carbon atoms is in the range of 2 to 8. R may also be tertiary alkyl. Typical R groups include —$CH(CH_3)_2$, —$CH(CH_3)C_2H_5$, —$CH(CH_3)C_6H_{13}$, —$CH(C_2H_5)_2$, —$CH(C_3H_7)C_4H_9$, —$C(CH_3)_3$ and —$C(CH_3)_2CH_2C(CH_3)_3$.

The reaction mixture after isomerization consists of an equilibrium mixture of the structures

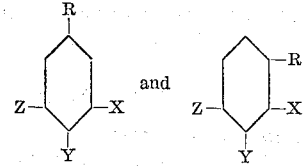

with the 3,5-disubstituted or 3,4,5-trisubstituted alkyl benzene as the major constituent. There are also often small amounts of the unreacted starting X, Y, Z-substituted benzene, its dialkylated derivative and condensation products present. The products may be separated by distillation. It is quite often expedient to isolate the distillation fraction containing the combined 2,3,4-X,Y,Z-substituted and the 3,4,5-X,Y,Z-substituted alkyl benzenes.

The reaction product of the isomerization reaction as isolated as a technical concentrate or the

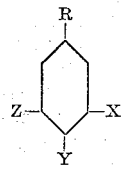

product either alone or in admixture with

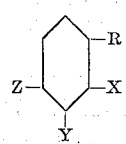

may be oxidized by the nitric acid procedure of I. V. Butina and V. G. Plyusin (see Chemical Abstracts 57, 9726e (1962) to the benzoic acid of the structure

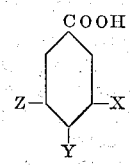

The 3,4,5-X,Y,Z-substituted alkyl benzene is more readily oxidized than its corresponding 2,3,4-X,Y,Z-substituted homologue. Accordingly, this provides an excellent means for preparing the 3,4,5-X,Y,Z-substituted benzoic acid without the necessity of costly purification of the intermediate alkyl benzene. Some oxidation of the 2,3,4-X,Y,Z- substituted alkyl benzene may occur and give minor amounts of a compound of the structure

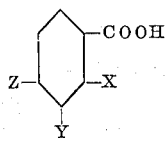

but the 2,3,4-X,Y,Z-substituted benzoic acid is only an inconsequential contaminant in the desired 3,4,5-X,Y,Z-substituted benzoic acid, but it does depress the melting point. For the oxidation, nitric acid having a concentration in the range of 15 to 70% may be employed. Dilute nitric acid in the range of 30–50% concentration is preferred. The more concentrated nitric acids may give some nitration of the benzene nucleus and the oxidation reaction is considerably slower with more dilute nitric acids. The theoretical amount of nitric acid used is that required to oxidize the carbon and hydrogen atoms of the $R^1$, $R^2$, and $R^3$ groups in —$C(R^1)(R^2)(R^3)$ to carbon dioxide and water. Up to 100% excesses of nitric acid may be employed. The oxidations are preferably run at reflux temperature (atmospheric pressure) in the range of 100°–150° C. Reaction times are in the range of 15 to 150 hours. Ammonium vanadate may be used as a catalyst if desired, but is not necessary. Typical processes used in preparing several compounds encompassed by this invention are given in the following examples which are presented for purposes of illustration and are not intended to limit the scope of the invention.

EXAMPLE 1

Preparation of 3,5-dichlorocumene using $HAlBrCl_3$ (A) Preparation of 3,5-dichlorocumene.—A reaction mixture consisting of 500 g. (3.4 moles) of m-dichlorobenzene and 90.5 g. (0.68 mole, 20 mole percent) of anhydrous $AlCl_3$ was cooled to 0° C. in a flask equipped with a Dry Ice reflux condenser. With vigorous stirring there was slowly added over a period of 1 hour, 420 g. (3.4 mole) of isopropyl bromide and the mixture was then allowed to warm to room temperature and stirred overnight. During the alkylation a 100% mol equivalent of hydrogen bromide is evolved and reacts with the aluminum chloride to produce $HAlBrCl_3$ and possibly some $HAlBr_2Cl_2$ and $HAlBr_3Cl$. It was determined by infrared spectroscopy that the first product formed was 2,4-dichlorocumene and that there was a gradual isomerization to 3,5-dichlorocumene to the extent of 75–80%. The reaction mixture was poured onto ice and extracted with hexane. The extract was washed with a potassium carbonate solution then dried and the solvent removed to give a residue. The residue was distilled under vacuum to give a fraction of 402 g. boiling at 50°–100° C. and 0.2–0.3 mm. pressure. By gas-liquid chromatography this was found to be breater than 95% dichlorinated cumenes and by infrared analysis was shown to be about 80% 3,5-dichlorocumene and 20% 2,4-dichlorocumene. The distillation residue was essentially 2,4-dichloro-5-isopropylcumene. The distilled fraction of 402 g. represents a 70% weight yield of dichlorocumenes.

When the above reaction was repeated using addition times of up to 10 hours for the isopropyl bromide and from 5 to 15 mol percent of aluminum chloride, essentially the same results were obtained. Repeating the reaction at an addition temperature for the isopropyl bromide of about 50° C. and with 5 mol percent of aluminum chloride gave a 1:1 ratio of 2,4-dichlorocumene and 3,5-dichlorocumene. Repeating the above reaction with 3 mol percent of aluminum chloride or with working up the reaction mixture immediately after the isopropyl bromide addition was completed gave 2,4-dichlorocumene as the major product.

When isopropyl chloride was substituted for the isopropyl bromide in the above reaction, even after a reaction period of one week, the major alkylation product was 2,4-dichlorocumene and very little rearrangement to 3,5-dichlorocumene had occurred.

(B) Preparation of 3,5-dichlorobenzoic acid.—The 402 g. fraction distilling at 50°–100° C. obtained in part (A) above was added to a solution of 3 g. of ammonium vanadate, 1500 ml. of concentrated nitric acid and 1500 ml. of water. With vigorous stirring the mixture was heated at reflux temperature for three days. After cooling, 300 ml. of hexane was added and after vigorous stirring, the mixture was filtered. The filter cake was suspended in 500 cc. of hexane, stirred and refiltered to give 250 g. of 3,5-dichlorobenzoic acid, melting at 170°–180° C. (Literature M.P.=188° C.). This illustrates the ease with which 3,5-dichlorocumene in a mixture with 2,4-dichlorocumene is preferentially oxidized to the corresponding benzoic acid. This method is particularly valuable when the desired product is a benzoic acid of the structure

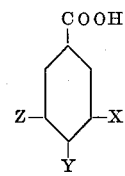

wherein X, Y, and Z have the meanings previously given.

EXAMPLE 2

Preparation of 3,5-dichlorocumene using $HAlBr_4$

In a reaction flask outfitted with a Dry Ice condenser, stirrer and addition funnel was placed 500 g. (3.4 moles) of m-dichlorobenzene and 181.5 g. (0.68 mole) of anhydrous $AlBr_3$. With stirring and cooling there was added 420 g. (3.4 moles) of isopropyl bromide. During the addition the temperature dropped to about −10° C. The reaction mixture was then allowed to rise to room temperature and was stirred for 2 days. The rate of isomerization was followed by means of infrared spectroscopy. The reaction mixture was worked up in the same manner as for Example IA. Distillation gave 350 g. of a fraction distilling at 50–100° C. at 0.2–0.3 mm. pressure. By means of infrared this was shown to be 80% 3,5-dichlorocumene and 20% 2,4-dichlorocumene.

EXAMPLE 3

Preparation of 3,5-difluorocumene

Into a reaction flask outfitted with a magnetic stirrer, Dry Ice condenser and addition funnel was placed 50 g. (0.437 mole) m-difluorobenzene and 11.7 g. (0.087 mole) of anhydrous aluminum chloride. There was added dropwise with stirring 54 g. (0.437 mole) of isopropyl bromide. The mixture was stirred overnight at room temperature. The product was worked up in the manner described for Example 1A and gave 55 grams of oil residue. By infrared examination this was shown to be more than 80% of 3,5-difluorocumene.

A sample was oxidized by a method of Example 1B to give 3,5-difluorobenzoic acid melting at 113–129° C. (Literature M.P.=121–122° C.).

EXAMPLE 4

Preparation of 3,5-dibromocumene

To a mixture of 50 g. (0.21 mole) of m-dibromobenzene and 5.7 g. (0.042 mole) of anhydrous aluminum chloride was slowly added 26.2 g. (0.21 mole) of isopropyl bromide. The reaction mixture was stirred overnight at room temperature. By infrared analysis it was determined that the 2,4-dibromocumene first formed was slowly isomerized to 3,5-dibromocumene. From the reaction mixture there was isolated 52 g. of residual oil which was more than 50% 3,5-dibromocumene. Its presence was confirmed by nitric acid oxidation to 3,5-dibromobenzoic acid.

EXAMPLE 5

Preparation of 3-chloro-5-fluorocumene

To a mixture of 1 kg. (7.69 mole) of 3-chlorofluorobenzene and 200 g. (1.5 mole) of anhydrous aluminum chloride was slowly added with stirring 946 g. (7.69 mole) of isopropyl bromide. Alkylation occurred to produce 2-chloro (or fluoro) -4-fluoro (or chloro)- cumene. The reaction mixture was then stirred three days at room temperature. The product was isolated by the procedure of Example 1A to give a distillate containing 767 g. of dihalocumene estimated by infrared analysis to contain more than 80% of 3-chloro-5-fluorocumene.

Oxidation of 648 g. of the cumene gave, after solution in base and reprecipitation with acid, 350 g. of 3-chloro-5-fluorobenzoic acid, which after one recrystallization from aqueous methanol had a melting point of 139°–145° C. This was found by analyses to contain 48.32% C, 2.34% H, 20.34% Cl, 10.87% F, calculated for $C_7H_4ClFO_2$ is 48.15% C, 2.29% H, 20.3% Cl and 10.9% F.

EXAMPLE 6

Preparation of 3-bromo-5-chlorocumene

To a mixture of 100 g. (0.52 mole) of 3-bromochlorobenzene and 13.9 g. (0.104 mole) of anhydrous aluminum chloride was added with cooling 64 g. (0.52 mole) of isopropyl bromide. The product produced was 2-bromo (or chloro)-4-chloro (or bromo) cumene. The mixture was then stirred three days at room temperature. The product was isolated in the same manner as for Example 1A and the resulting residual oil was distilled. There was isolated 66.5 g. of oil distilling at 48°–55° C. at 0.2 mm. pressure. By gas-liquid chromotography this was shown to be exclusively a monoalkylated derivative. By infrared analysis the product was found to be 90% 3-bromo-5-chlorocumene and 10% 2-bromo (or chloro)-4-chloro (or bromo) cumene.

A sample of the product was oxidized by the nitric acid method of Example 1B to 3-bromo-5-chlorobenzoic acid, a white solid melting at 175–183° C. (Literature M.P. 189–190° C.).

EXAMPLE 7

Preparation of 3-bromo-5-methylcumene

To a mixture of 50 g. (0.29 mole) of m-bromotoluene and 6 g. (0.045 mole) of anhydrous aluminum chloride was added with stirring and cooling 36 g. (0.29 mole) of isopropyl bromide. The product which formed was 2-bromo (or methyl)-4-methyl (or bromo)-cumene. The reaction mixture was then stirred overnight and was then hydrolyzed. The resulting product was isolated to give 61 g. of oil which by infrared analysis was shown to be 90% 3-bromo-5-methylcumene. This vil was oxidized by the method of Example 1B to give 20.2 g. of 3-bromo-5-methyl-benzoic acid melting at 176°–178° C. (Literature M.P.=177° C.).

EXAMPLE 8

Preparation of 3-chloro-5-methylcumene

To a mixture of 25 g. (0.2 mole) of m-chlorotoluene and 3 g. (0.022 mole) of anhydrous aluminum chloride was added with stirring and cooling over a period of 30 minutes 25 g. (0.2 mole) of isopropyl bromide. Infrared examination showed that 2-chloro(or methyl)-4-methyl (or chloro)cumene was formed. The reaction mixture was stirred 20 hours at room temperature, then worked up as described for Example 1A. There was obtained 30 g. of colorless oil. Gas-liquid chromatography showed the oil to be largely the monoalkylated derivatives contaminated with a little m-chlorotoluene and a small amount of the di-iso-propyl derivative of this. By infrared spectroscopy the oil was shown to be 80% of 3-chloro-5-methylcumene.

A sample was oxidized by the nitric acid method of Example 1B to give 3-chloro-5-methylbenzoic acid, which after recrystallization from aqueous methanol was found to melt at 177–178.5° C. (Literature M.P.=178° C.).

EXAMPLE 9

Preparation of 3,5-dimethylcumene

To a mixture of 530 g. (5.0 moles) of m-xylene and 100 g. (0.75 mole) of anhydrous aluminum chloride was added dropwise with stirring over a period of 7 hours 615 g. (5.0 moles) of isopropyl bromide. The temperature during the addition was in the range of 20–30° C. The reaction mixture was stirred at room temperature for 12 hours and was in two phases. The upper layer was separated, diluted with hexane, washed with water and concentrated to give 560 g. of almost colorless liquid. The lower layer from the reaction was poured onto ice, extracted with hexane, washed and concentrated to give 169 g. of slightly yellow liquid. The two products were found by gas-liquid chromotography to be 93% dimethylcumene. The combined oils were distilled under vacuum to give a main fraction of 687.5 g. boiling at 40° at 0.15 mm. pressure. This was a water-clear liquid having a refractive index at 26.5° C. of 1.4939. By gas-liquid chromotography this was found to be 99.2% of dimethylcumene and by infrared analysis to be essentially pure 3,5-dimethylcumene. The distilled product represents at 92.8% yield of 3,5-dimethylcumene.

3,5-dimethylcumene (296.5 g., 2.0 moles) was oxidized with 3780 g. (18 moles) of 30% nitric acid in the presence of 3 g. of ammonium vanadate by refluxing for 26 hours. Cooling gave a granular solid which was dissolved in 20 % sodium hydroxide and the solution was extracted with hexane. The aqueous layer was acidified to give 266 g. of solid which was found by infrared analysis to be a mixture of 3,5-dimethylbenzoic acid and 5-methylisophthalic acid. The mixture was separated by slurrying in hot benzene. The insoluble solid amounted to 102.5 g. of 5-methylisophthalic acid melting at 250°–280° C. From the filtrate there was isolated 101.2 g. of 3,5-dimethylbenzoic acid melting at 161°–164° C. (literature melting point is 166° C.) and 57 g. of somewhat crude 3,5-dimethylbenzoic acid.

The combined 3,5 - dimethylbenzoic acid products amounted to a 53% yield.

EXAMPLE 10

Preparation of 3,4,5-trichlorocumene

To a mixture of 50 g. (0.275 mole) of 1,2,3-trichlorobenzene, 20 ml. of carbon disulfide and 6 g. (0.045 mole) of anhydrous aluminum chloride was slowly added with stirring 34 g. (0.275 mole) of isopropyl bromide. After an initiation period, a vigorous reaction set in and the mixture refluxed. There was produced 2,3,4-trichlorocumene. After stirring overnight at room temperature, the reaction mixture was poured onto ice and the product isolated by extraction, washing and solvent removal as in Example 1A. The residual oil weighed 52.5 g. and by infrared analysis was estimated to contain about 50% 3,4,5-trichlorocumene.

Oxidation by the nitric acid procedure of Example 1B gave a mixture of 2,3,4- and 3,4,5-trichlorobenzoic acid melting at 170–195° C. which could not be separated by recrystallization. The literature melting point for 2,3,4-trichlorobenzoic acid is 187°–188° C. and for 3,4,5-trichlorobenzoic acid is 210° C.

EXAMPLE 11

Preparation of 3,5-dichloro-4-methylcumene

A mixture of 25 g. (0.155 mole) of 2,6-dichlorotoluene and 3 g. (0.022 mole) of anhydrous aluminum chloride was stirred with cooling as 22 g. 0.178 mole) of isopropyl bromide was added dropwise. 2,4-dichloro-3-methylcumene was formed. The reaction mixture was stirred at room temperature overnight, then worked up by the procedure of Example 1A. There was obtained 30 g. of oil. Infrared analysis indicated that this was essentially pure 3,5-dichloro-4-methylcumene.

Oxidation by the nitric acid procedure of Example 1B gave a solid which without further purification melted at 188–190° C. (Literature M.P.=188° C.).

EXAMPLE 12

Preparation of 3,5-dichloro-t-butylbenzene

To a mixture of 441 g. (3.0 moles) of m-dichlorobenzene and 80 g. (0.6 mole) of anhydrous aluminum chloride was added over a period of 5 hours with cooling at 0–5° C. 411 g. (3.0 moles) of 2-bromo-2-methylpropane. After standing overnight the mixture was stirred 48 hours at room temperature. The reaction mixture was 2 layers. The upper layer after separation and washing with water gave 354.5 g. of almost colorless oil which by gas-liquid chromotography was shown to be 39.7% of a monoalkylated derivative. This was distilled to give recovered m-dichlorobenzene, a 25.7 g. fraction distilling at 42–48° C. at 0.25 mm. pressure and 111 g. distilling 52–53° C. at 0.2 mm. pressure. By infrared analysis the 25.7 g. fraction was determined to be 84.6% 3,5-dichloro-t-butylbenzene and the 111 g. fraction was found to be 100% 3,5-dichloro-t-butylbenzene. From the lower layer there was isolated 172 g. of dark oil which by gas-liquid chromatography was found to be greater than 80% m-dichlorobenzene and the remainder was mono- and dialkylated derivatives.

3,5-dichloro-t-butylbenzene was not oxidized after 4 days refluxing using the method of Example 1B. Alternative oxidation procedures were not attempted.

When m-dichlorobenzene was alkylated with n-hexyl bromide by the method of Example 1A, it was found that 2,4-dichlorophenylhexane was produced, but that its rate of isomerization to the 3,5-dichloro isomer was very slow.

EXAMPLE 13

Preparation of 3,5-dichlorophenol

Into a 500 ml. flask outfitted with a magnetic stirrer, thermometer and an addition tube for working under pressure was placed 10 g. (0.053 mole) of a dichlorocumene made by the method of Example 1A and which contained 80% 3,5-dichlorocumene and 20% 2,4-dichlorocumene, 1 drop of a ketone peroxide catalyst known by the trademark name of Lupersol DNF and 0.5 g. of anhydrous potassium carbonate. The reaction flask was flushed with nitrogen, then with oxygen, heated to 120° C., vented and charged with oxygen to a pressure of 10.18 inches of mercury. The amount of oxygen was calculated to be 0.118 l. (0.0053 mole). The reaction mixture was stirred for 3 hours at 120°–130° C. and by the drop in pressure it was estimated that about 2% of the cumene had reacted. Another charge of the catalyst was then introduced and the reaction heated 2 more hours at 130° C. at which point the reaction had proceeded to the extent of about 4.5%. More oxygen was then charged to bring the pressure back to the original one and another charge of catalyst introduced. The reaction then proceeded for 2 more hours at 130° C. and the total per cent reacted was found to be 7.5%. Another charge of catalyst was introduced. After 2 more hours of reaction at 130° C. the extent of the reaction was 10.5%. At this point more oxygen was introduced to bring the pressure up to that at the start of the reaction and another charge of catalyst was introduced. After two more hours of reaction at 130° C. the total amount of the cumene reacted was estimated to be 15%. By infrared examination it was shown that a cumene hydroperoxide was present. Aqueous sulfuric acid was added, and the organic layer was extracted with benzene and washed with aqueous sodium hydroxide. One hundred milligrams of 3,5-dichlorobenzoic acid was isolated from the aqueous washings. The organic layer gave 9 g. of yellow oil in which the presence of a cumene hydroperoxide was confirmed by infrared. Seven grams of this oil was stirred on a steam bath for 2 days with 100 ml. of 20% sulfuric acid. The organic layer was extracted with benzene and washed with 10% sodium hydroxide. The aqueous washings were acidified and extracted with ether. From the ether extract there was isolated 20 mg. of oil which crystallized on cooling. By infrared examination, and by comparison with an authentic sample, this oil was determined to be 3,5-dichlorophenol.

The procedure of Example 13 provides a method for preparing 3,5- and 3,4,5-substituted phenols which heretofore have been difficult to obtain.

We claim:

1. A process for the preparation of an alkyl benzene of the formula

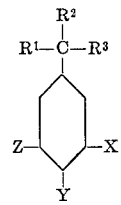

(I)

wherein X and Z are bromine, chlorine, or fluorine, Y is hydrogen, bromine, chlorine, or fluorine, $R^1$ is hydrogen or an alkyl group of one to six carbon atoms and $R^2$ and $R^3$ are alkyl groups of one to six carbon atoms which comprises isomerizing an alkyl benzene of the formula

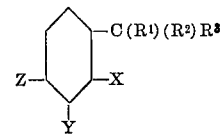

(II)

by contacting, at a temperature of about −10° C. to +75° C., said alkyl benzene with a catalyst selected from the class consisting of $HAlBrCl_3$, $HAlBr_2Cl_2$, $HAlBr_3Cl$ and $HAlBr_4$, said catalyst being present in an amount of about 5 to 25 mole percent of the amount of said alkyl benzene.

2. A process according to claim 1 in which the isomerization is accomplished by contacting the said alkyl benzene of structure (11) with an amount of said catalyst which corresponds to 5 to 15 mol percent of the amount of said alkyl benzene.

3. A process according to claim 1 in which the isomerization is run in the presence of carbon disulfide as a solvent.

4. A process according to claim 1 in which the said catalyst is $HAlBrCl_3$.

5. A process according to claim 1 in which the catalyst is $HAlBr_4$.

6. A process according to claim 1 in which 2,4-dichlorocumene is isomerized to 3,5-dichlorocumene.

7. A process according to claim 1 in which 2,4-difluorocumene is isomerized to 3,5-difluorocumene.

8. A process according to claim 1 in which 2,3,4-trichlorocumene is isomerized to 3,4,5-trichlorocumene.

References Cited

Brown et al., J. Am. Chem. Soc. 77, 5579–5584 (1955).
Baur, Ber Deut. Chem. 24, 2840–2841 (1891).

DANIEL D. HORWITZ, Primary Examiner

U.S. Cl. X.R.

260—524, 610, 623, 671